United States Patent
Baracca et al.

(10) Patent No.: US 12,490,248 B2
(45) Date of Patent: Dec. 2, 2025

(54) METHOD AND APPARATUS FOR RADIO JAMMING DETECTION

(71) Applicant: NOKIA SOLUTIONS AND NETWORKS OY, Espoo (FI)

(72) Inventors: Paolo Baracca, Munich (DE); Leonardo Chiarello, Munich (DE); Karthik Upadhya, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 403 days.

(21) Appl. No.: 18/106,784

(22) Filed: Feb. 7, 2023

(65) Prior Publication Data

US 2023/0254833 A1 Aug. 10, 2023

(30) Foreign Application Priority Data

Feb. 9, 2022 (FI) ..................................... 20225110

(51) Int. Cl.
- *H04W 72/0453* (2023.01)
- *H04K 3/00* (2006.01)
- *H04L 5/00* (2006.01)

(52) U.S. Cl.
CPC .......... *H04W 72/0453* (2013.01); *H04K 3/22* (2013.01); *H04L 5/0005* (2013.01)

(58) Field of Classification Search
CPC .. H04W 72/0453; H04W 12/121; H04K 3/22; H04L 5/0005
See application file for complete search history.

(56) References Cited

U.S. PATENT DOCUMENTS

| | | | |
|---|---|---|---|
| 2008/0143580 A1 | 6/2008 | Glazko et al. | |
| 2011/0151790 A1 | 6/2011 | Khandekar et al. | |
| 2014/0376667 A1* | 12/2014 | Zeng | ............ H04L 27/2647 375/340 |
| 2016/0134979 A1 | 5/2016 | El-Hoiydi | |

(Continued)

FOREIGN PATENT DOCUMENTS

| | | |
|---|---|---|
| CN | 1798982 A | 7/2006 |
| CN | 101714881 A | 5/2010 |

(Continued)

OTHER PUBLICATIONS

Office Action dated Apr. 8, 2022 corresponding to Finnish Patent Application No. 20225110.

(Continued)

*Primary Examiner* — Yu-Wen Chang
(74) *Attorney, Agent, or Firm* — SQUIRE PATTON BOGGS (US) LLP (57) ABSTRACT

A solution for radio jamming detection is disclosed. The solution comprises determining M subcarriers in a time-frequency resource grid to be blanked and outputting the M subcarriers in the time-frequency resource grid to be blanked by performing at least one of the following operations: first determination of a number M of subcarriers in a time-frequency resource grid to be blanked based on probability of detecting a jammer attack or on channel quality of subcarriers in the time-frequency resource grid, second determination of which M subcarriers in the time-frequency resource grid are blanked taking into account the channel quality of subcarriers in the time-frequency resource grid.

14 Claims, 8 Drawing Sheets

(56) References Cited

U.S. PATENT DOCUMENTS

| | | | |
|---|---|---|---|
| 2016/0233998 A1* | 8/2016 | Sun | H04B 17/336 |
| 2017/0188379 A1* | 6/2017 | Shtrom | H04L 5/0023 |
| 2017/0272222 A1* | 9/2017 | Fröberg Olsson | H04L 5/0073 |
| 2018/0035416 A1* | 2/2018 | Yi | H04L 5/0037 |
| 2019/0028141 A1 | 1/2019 | Padden et al. | |

FOREIGN PATENT DOCUMENTS

| | | | |
|---|---|---|---|
| CN | 105284055 A | 1/2016 | |
| CN | 113572551 A | 10/2021 | |
| EP | 1289185 A2 | 3/2003 | |
| EP | 3905559 A1 | 11/2021 | |
| WO | 2005117283 A2 | 12/2005 | |
| WO | 2005117283 A3 | 12/2005 | |

OTHER PUBLICATIONS

Finnish Search Report dated Apr. 8, 2022 corresponding to Finnish Patent Application No. 20225110.

Leonardo Chiarello et al., "Jamming Detection with Subcarrier Blanking for 5G and Beyond in Industry 4.0 Scenarios," 2021 IEEE 32nd Annual International Symposium on Personal, Indoor and Mobile Radio Communications (PIMRC), 2021, pp. 758-764, Oct. 22, 2021.

Communication of Acceptance—section 29 a of Patents Decree dated Sep. 30, 2022 corresponding to Finnish Patent Application No. 20225110.

Extended European Search Report dated Jun. 21, 2023, corresponding to European Patent Application No. 23152986.8.

Leonardo Chiarello et al: "Jamming Resilient Indoor Factory Deployments: Design and Performance Evaluation", arxiv.org, Cornell University Library, 201 Olin Library Cornell University Ithaca, NY 14853, Feb. 2, 2022 (Feb. 2, 2022).

Notification of Second Office Action dated Oct. 22, 2024, in corresponding Chinese Application No. 2023100835683, with English translation thereof.

Office Action and Search Report dated Mar. 1, 2024, corresponding to Chinese Patent Application No. 202310083568.3.

Leonardo Chiarello et al., "Jamming Detection with Subcarrier Blanking for 5G and Beyond in Industry 4.0 Scenarios," Department of Information Engineering, University of Padova, Italy. pp. 758-764, Dec. 31, 2021.

* cited by examiner

METHOD AND APPARATUS FOR RADIO JAMMING DETECTION

CROSS REFERENCE TO RELATED APPLICATION

This application claims the benefit of Finnish Patent Application No. 20225110, filed Feb. 9, 2022. The entire content of the above-referenced application is hereby incorporated by reference.

TECHNICAL FIELD

The invention relates to communications.

BACKGROUND

Malicious activities may cause, for example, performance and integrity issues to a communications system. One example of such malicious activity is radio jamming which may be performed by one or more radio jammers that intentionally inject interference to a communications system with the purpose of decreasing performance of the system. Therefore, providing solutions for radio jamming problems may prove helpful in maintaining the performance of the communications system.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

In an embodiment, an apparatus is configured to determine M subcarriers in a time-frequency resource grid to be blanked and output the M subcarriers in the time-frequency resource grid to be blanked by performing at least one of the following operations: first determination of a number M of subcarriers in the time-frequency resource grid to be blanked based on probability of detecting a jammer attack or on channel quality of subcarriers in the time-frequency resource grid, second determination of which M subcarriers in the time-frequency resource grid are blanked taking into account the channel quality of subcarriers in the time-frequency resource grid.

In an embodiment, an apparatus is configured to determine detection probability to a given type of jamming attack and determine the number M of subcarriers with which the detection probability is larger than a given threshold.

In an embodiment, an apparatus is configured to select a key performance indicator of the wireless communication network and determine the number M of sub carriers with which the key performance indicator is larger than a given threshold.

In an embodiment, an apparatus is configured to select a key performance indicator of the wireless communication network, compute the key performance indicator for different configurations of M blanked subcarriers or subcarrier groups, compute coherence time of channel on which blanking is utilized, determine blanking probability for the different configurations of M blanked subcarriers or sub carrier groups and select the configuration of M blanked subcarriers or subcarrier groups having highest blanking probability.

BRIEF DESCRIPTION OF DRAWINGS

In the following some embodiments will be described with reference to the attached drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), 6G, worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1A:
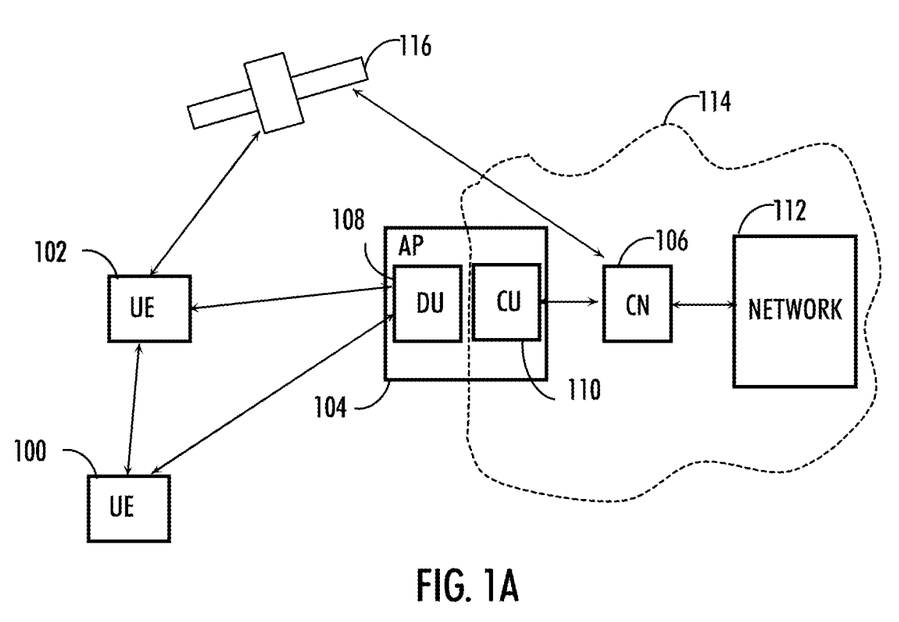
FIG. 1A illustrates an example of a wireless communication system to which embodiments may be applied.

FIG. 1A depicts examples of simplified system architectures only showing some elements and functional entities, all being logical units, whose implementation may differ from what is shown. The connections shown in FIG. 1A are logical connections; the actual physical connections may be different. It is apparent to a person skilled in the art that the system typically comprises also other functions and structures than those shown in FIG. 1A.

The embodiments are not, however, restricted to the system given as an example but a person skilled in the art may apply the solution to other communication systems provided with necessary properties.

FIG. 1A shows devices 100 and 102. The devices 100 and 102 may, for example, be user devices or user terminals. The devices 100 and 102 are configured to be in a wireless connection on one or more communication channels with a node or access point 104. The node 104 is further connected to a core network 106. In one example, the node 104 may be an access node, AN, such as (e/g)NodeB, serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC).

The device (also called a subscriber unit, user device, user equipment (UE), user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without an universal subscriber identification module (USIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1A) may be implemented.

5G or NR (New Radio) enables using multiple input-multiple output (MIMO) antennas, many more base stations or nodes than the Long Term Evolution, LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, 6 or above 24 GHz—cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1A by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at or close to a remote antenna site (in a distributed unit, DU 108) and non-real time functions being carried out in a centralized manner (in a centralized unit, CU 110).

It should also be understood that the distribution of tasks between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication 116 to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano) satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1A may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Radio jamming by a malicious device is a type of security attack that can threaten the performance a communication system, such as the system described above with reference to FIG. 1A. A radio jammer is a malicious device whose purpose is to intentionally inject interference. It does not necessarily transmit any information. Purpose of a radio jammer may be to realize a denial-of-service (DoS) attack. There exist different types of radio jammers. A basic radio jammer transmits power on some narrow- or wide-bands. A more advanced radio jammer may be reactive. It may stay silent when the channel(s) is inactive and start transmitting when it detects transmission on the channel(s). A reactive radio jammer may even utilize the format of a standardized packet (compliant with the standard used on that radio band or channel) in the jamming signal.

Figure 1B:
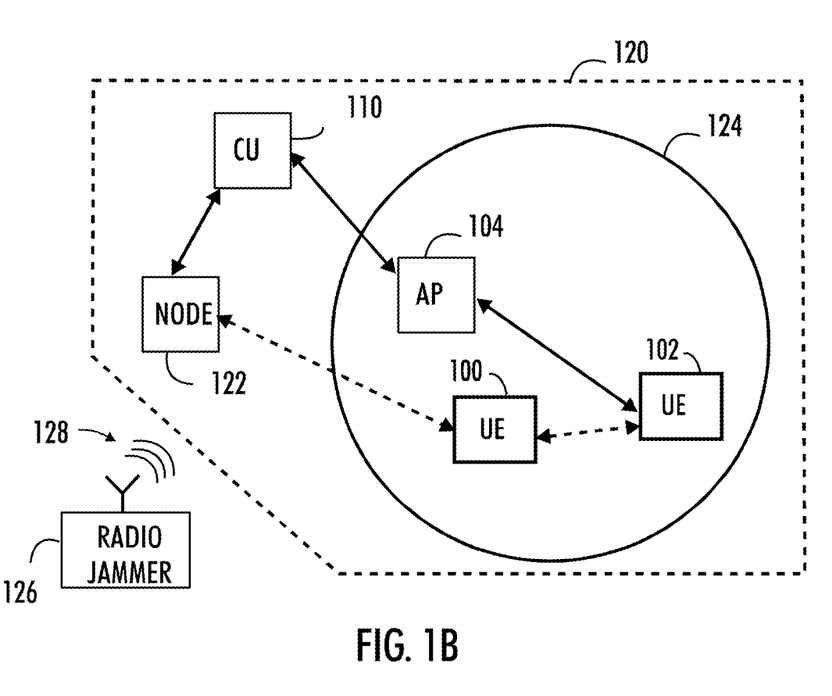
FIG. 1B illustrates an example of a wireless communication system to which embodiments may be applied.

Referring to FIG. 1B, CU 110 in communication with access points or network nodes 104, 122 is shown. Network node 122 may be similar to node 104 which was discussed above in more detail. For example, CU/DU-split may be used, or CU and DU may be located in the same physical and/or logical device. For example, in case CU/DU split is used, CU-DU communication may be realized via F1 interface. As shortly discussed above, it is also possible to use an alternative architecture in which one of the nodes 104, 122 realizes the role of CU 110, in a master-slave principle, so that the node that has the CU role is a master of other nodes (e.g. DUs) in the system or network. In such case, the communication between different network elements may be realized via Xn interface.

CU 110 may control the nodes 104, 122, and nodes 104, 122 may provide services within a geographically restricted area 120. Such area may be, for example, plant or factory area. In the example of FIG. 1B, service is provided by network node 104 in the area of radio cell 124 to UEs 100, 102. At this point it is highlighted that although only two UEs and two nodes are shown, there may be more than two of said devices depending on system implementation and required service level, for example. It is further noted that dotted lines between UE 100 and node 122 and UEs 100, 102 may depict possible additional or alternative communication links (e.g. multi-connectivity scenario(s) or cell change or sidelink communications).

As shown in the example of FIG. 1B, radio jammer 126 transmits radio jamming signal 128 outside the restricted area 120. The radio jamming signal 128 may cause the performance of the communication system to deteriorate. For example, the provided service level may decrease, or the service may be totally stopped. According to an embodiment, the radio jammer 126 is a reactive radio jammer 126. The radio jammer may also be inside the restricted area 120.

It is noted at this point that radio jamming may differ from general interference caused by e.g. other devices of the system. For example, legitimate device (e.g. UE or network node, such as AP or DU) may create interference respecting the standard rules, such as timing, power and/or scheduling. However, a radio jammer is a malicious device that intentionally attacks the system and its activity can be extremely dangerous: smart jamming attacks can bring a network down even with a small jamming activity. It needs to be understood that the purpose of radio jamming may be to perform the radio jamming so that it is hard to be detected and mitigated. Therefore, radio jammer may not follow any standard timing, power and/or scheduling rules. Thus, there may be a need to provide solutions targeted for decreasing problem(s) created by radio jammers. In particular, such solutions may be beneficial for private cellular network (e.g. private 5G networks), but same solutions may be applicable to different types of wireless communication networks and systems. Therefore, there is proposed a radio jamming detection solution which may be utilized in wireless communication networks for detecting a presence of radio jamming.

In an embodiment, the wireless network described with reference to FIGS. 1A and 1B is a cellular network. The cellular network may be a private cellular network, wherein the same blanked subcarrier index data is shared amongst a plurality of network elements of the private cellular network. The proposed solution may be particularly suitable for a private 5G network scenario where a given set of network nodes communicate with a given number of UE devices, with a CU coordinating the activity of all these network nodes. For instance, the solution may be applied to any Industry 4.0 scenario, where a vertical player decides to deploy its own 5G private network on its factory plants and/or production sites.

Disabling jamming attacks may be categorized in two tasks, detecting the jammer attack and mitigating the effects of the attack.

It is important to detect the presence of a jammer when it is active. It may be noted that merely detecting some network performance degradation does not necessarily mean that there is a jammer, because some performance degradation may also happen because of fading or some legitimate cellular interference. Therefore, jammer detection is a challenging task. However, when a jammer is detected, it is then important to characterize its activity as much as possible.

After a jammer has been detected, selected mitigation techniques need to be applied in order to limit the jammer. There are various methods for mitigating a jammer known in the art, such as direct sequence spread spectrum, by signal spreading and de-spreading; frequency hopping spread spectrum, by hopping carrier on the system band; beamforming, by applying weights at the antennas to steer beams in proper direction, power control, by increasing the transmit power; link adaptation, by using more robust QAM constellation sizes and coding schemes and dummy Physical resource block, PRB, transmission, by transmitting dummy packets on unused PRBs in order to hide the legitimate transmission, to name a few.

As mentioned, detecting jamming attacks is a challenging task, mainly because it involves distinguishing these malicious behaviours from legitimate bad radio conditions (such as cellular interference, fading) that cause poor communications system performance.

One advanced method for detecting jammer in wireless communication systems exploiting multi carrier modulation like OFDM is to utilize blanking of some subcarriers in each OFDM symbol. If the blanked subcarriers are varied, the jammer can detect which subcarriers are blanked in each OFDM symbol but cannot predict in advance which subcarriers will be blanked in the following OFDM symbols. Even if the jammer is reactive, when it starts transmitting (for example on the whole signal band), it will transmit also on these blanked subcarriers, the generated interference can be observed by the receiver, and the jammer can be very easily detected (as its signal needs to be distinguished just from the thermal noise by activating some basic coordination among neighbouring base stations).

On the other hand, blanking the subcarriers represents a waste of resources. Thus, selecting which subcarriers to blank has an effect on the system capacity and signal quality.

Figure 2:
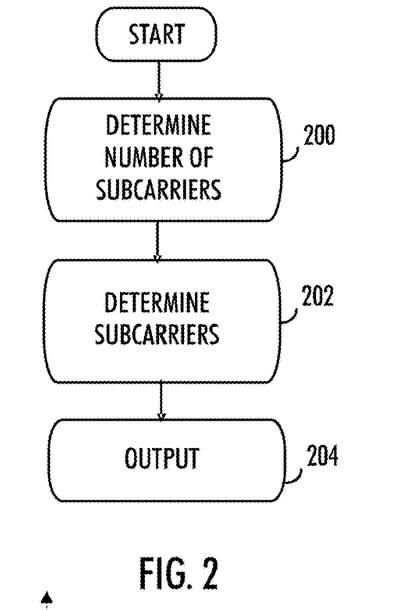
FIG. 2 is a flowchart according to an embodiment.

FIG. 2 illustrates a flowchart according to an embodiment. The flowchart illustrates an example of the operation of an apparatus of a wireless communication network. In an embodiment, the apparatus may be a network node or (e/g)NodeB, a part of a network node or (e/g)NodeB, or a mobile terminal or a part of a mobile terminal or any other apparatus capable of executing following steps.

The apparatus is configured to determine M subcarriers in a time-frequency resource grid to be blanked by performing at least one of the following two operations:

A first determination 200 of a number M of subcarriers in a time-frequency resource grid to be blanked based on probability of detecting a jammer attack or on channel quality of subcarriers in the time-frequency resource grid.

A second determination 202 of which M subcarriers in the time-frequency resource grid are blanked taking into account the channel quality of subcarriers in the time-frequency resource grid.

In an embodiment, when the M subcarriers are determined, the apparatus may be configured to output 204 the M subcarriers in the time-frequency resource grid to be blanked.

If only first determination is performed the apparatus may be configured to select which M subcarriers are blanked pseudo-randomly.

If only second determination is performed, the apparatus may be configured to select the number M of subcarriers to be blanked pseudo-randomly or as a fixed number.

In an embodiment, the apparatus is configured to initiate reception of a transmission from a second apparatus of the wireless communication network on said time-frequency resource grid, perform an interference measurement on said one or more blanked subcarrier to obtain interference measurement data on said one or more blanked subcarriers; and output the interference measurement data for detecting a presence of radio jamming.

In an embodiment, the apparatus is configured to perform the detection of the presence of radio jamming based on the outputted interference measurement data.

The described methods may be applicable in the system(s) of FIGS. 1A and 1B, for example. The apparatus discussed with respect to FIG. 2 may be, for example, network node 104, UE 100, or UE 102, or some other similar network device. Similarly, the second apparatus may refer to network node 104, UE 100, or UE 102. For example, if the apparatus is network node 104, the second apparatus may be UE 100 or UE 102. For example, if the apparatus is UE 100 or UE 102, the second apparatus may be network node 104.

A time-frequency resource grid may refer, for example, to radio symbol or radio symbols, such as orthogonal frequency-division multiplexing, OFDM, symbol(s), which are used as examples herein. However, the proposed solution may be applicable to other type of systems than only radio symbol-based systems (e.g. OFDM modulation utilizing systems). Thus, the different examples and embodiments described as with radio symbols or OFDM symbols may be applicable to systems utilizing different type of time-frequency resource allocation. Thus, for example, the blanked of the one or more subcarriers may be blanked subcarrier(s) of a radio symbol, such as OFDM symbol.

In an embodiment, the channel quality of subcarriers is taken into account when selecting the number and location of subcarriers to blank. Let us consider one example with reference to FIG. 3. Let us assume that devices in the described system communicate use OFDM modulation, with an OFDM symbol comprising a given number of subcarriers. It is noted that the system may utilize different modulation and different radio symbol(s) than OFDM modulation and OFDM symbol(s). However, due to simplicity reasons, OFDM symbol is used as an example throughout the description. The provided examples and embodiments may be applicable to systems utilizing some other type of radio symbols than OFDM symbols, for example. According to an embodiment, the radio symbol discussed herein refers to OFDM symbol.

Figure 3:
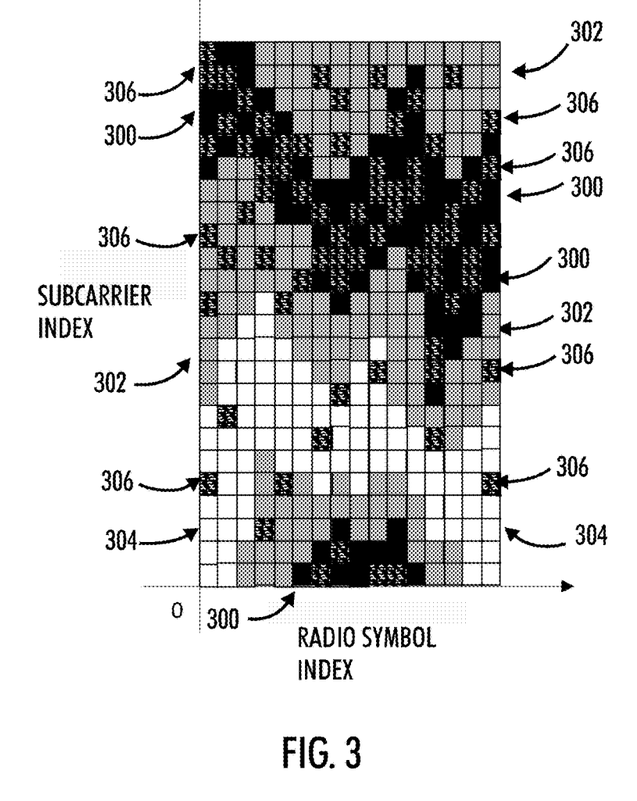
FIG. 3 illustrates sub carriers having different channel quality.

As shown in FIG. 3, there are subcarriers having different channel quality. Subcarriers having a bad signal to interference and noise ratio (SINR) (300) are shown as having a dark fill. Subcarriers having a medium SINR (302) are shown as having a light fill. Subcarriers having a good SINR (304) are shown as having a white fill. Part of the subcarrier(s) in OFDM symbols are blanked (306). Blanked subcarriers are shown as having hash fill (306) with white background.

Non-blanked subcarriers 300, 302, 304 may refer to data subcarriers used to transmit user plane and/or control plane data in the system.

In an embodiment, blanking may be designed such that more blanking happens for the subcarriers with bad channels, i.e., the dark ones (300) in FIG. 3, and less blanking happens for the subcarriers with good channels, i.e., the white ones (304) in the figure. The number of blanked subcarriers may be in part dependent on the channel quality of the subcarriers.

This provides the advantage of avoiding compromising too much on communications system channel quality.

In an embodiment, the channel quality is measured by utilizing Key Performance Indicators, KPI, of the communication system.

The blanking needs to be not easily predictable by a reactive jammer. In an embodiment, in a static scenario, the blanking should not be applied merely to the bad channels, because in this way a smart jammer could easily track the sub-bands where blanking takes place and focus the attacks on other sub-bands. In an embodiment, coherence time of the channel is taken into account. Therefore, as in the example of FIG. 3, some subcarriers having good or medium quality are blanked.

The interference generated by the radio jammer may be observed by the receivers, and the radio jammer may be detected. The detection may further comprise distinguishing the radio jamming signal from thermal noise and legitimate radio interference.

Interference measurement and interference measurement data should be understood broadly in the sense that such measurements may be, for example, standard power or signal strength measurements, but which are performed on the blanked subcarriers. So, the purpose of those interference measurements may be to detect and measure radio jamming, and thus those measurement(s) could be understood as radio jamming measurement(s). One example of interference measurement value in this context may be interference power value (IPV) which may be measured by the network node 104, 122 or UE 100, 102, for example.

The number of subcarriers to blank may be determined in various ways. In an embodiment, the blanked subcarriers may be selected as subcarrier groups. A subcarrier group may comprise a PRB, a set of adjacent PRBs, or a set of non-adjacent PRBs, for example.

Figure 4:
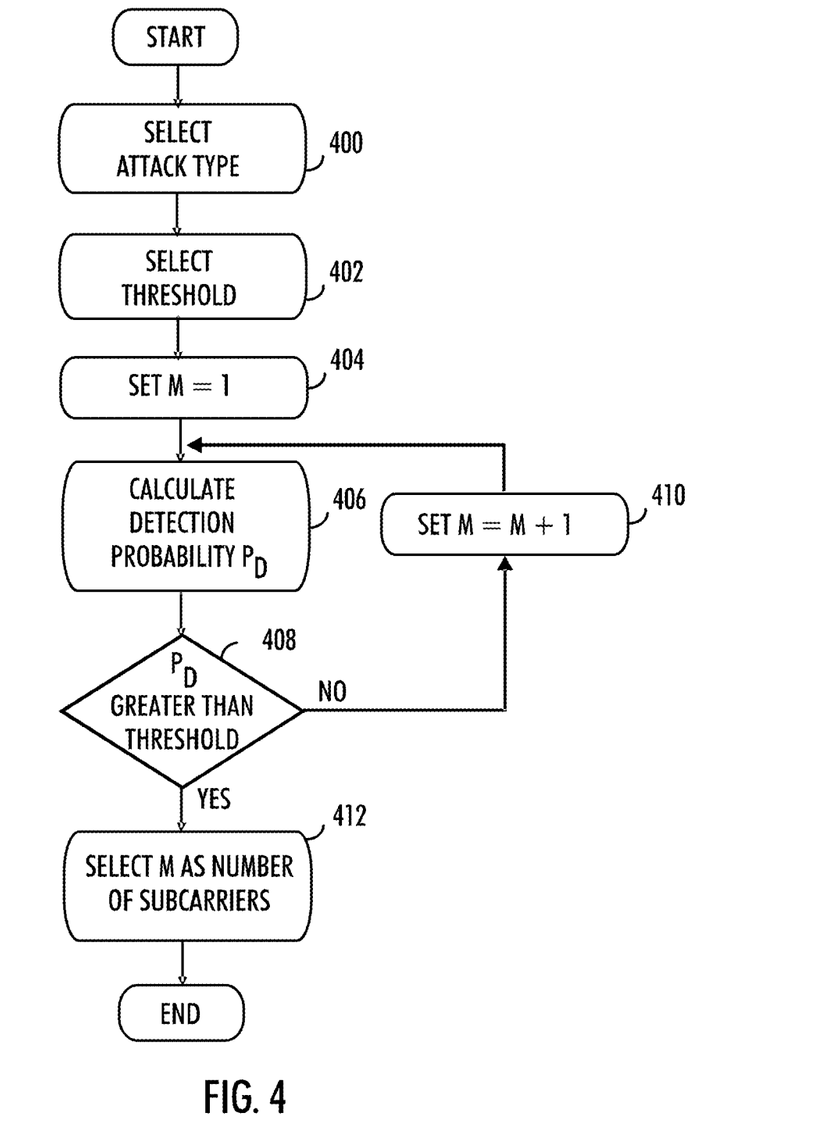
FIGS. 4, 5, 6, 7 and 8 are flowcharts according to some embodiments.

FIG. 4 illustrates a flowchart according to an embodiment. The flowchart illustrates an example of the operation of an apparatus of a wireless communication network utilizing a missed detection, MD, probability mode in determining number of subcarriers. In an embodiment, the apparatus may be a network node or (e/g)NodeB, a part of a network node or (e/g)NodeB, or a mobile terminal or a part of a mobile terminal or any other apparatus capable of executing following steps.

In step 400, the apparatus is configured to select an attack type to detect. For example, the attack type may be a wideband Gaussian jammer generating a received power spectral density greater than η dBm/Hz. Such a jammer generates a signal over the bandwidth B represented by a Gaussian random process, i.e., where every random variable drawn from that process has a Gaussian distribution with statistical power greater than η·B dBm.

In step 402, the apparatus is configured to select a minimum desired detection probability for the chosen attack and set it as a threshold γ. In an embodiment, the threshold may depend on service or application. For example, in life-critical applications the threshold may be higher than in non-life-critical applications. It may be selected by the operator or owners of the restricted area, for example.

In step 404, the apparatus is configured to set the number M of subcarriers to be blanked equal to 1.

In step 406, the apparatus is configured to calculate the detection probability $P_D$ of the selected attack type using M blanked subcarriers.

In step 408, the apparatus is configured to compare the computed detection probability $P_D$ with the threshold. If the threshold is not reached, i.e. $P_D<\gamma$, the apparatus is configured to set M=M+1 in step 410 and go back to step 406.

Otherwise, in step 412, the apparatus is configured to select M as the number of subcarriers to be blanked.

The method of FIG. 4 may be performed offline, taking into account statistical information of the channel but not actual channel.

In an embodiment, the calculation in step 406 may be performed in various ways. In an embodiment, simulation with different combinations may be performed and stored in a table or a database, from which values may be fetched.

In an embodiment, $P_D$ may be computed analytically for different jamming types.

Figure 5:
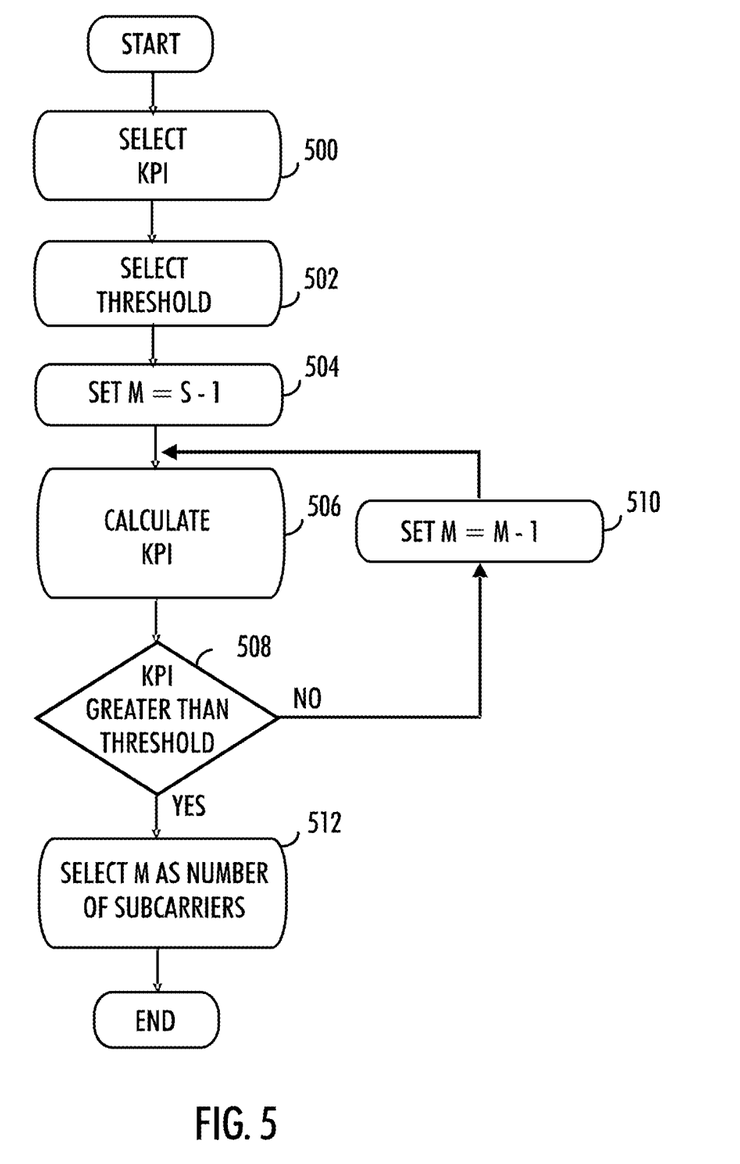

FIG. 5 illustrates a flowchart according to an embodiment. The flowchart illustrates an example of the operation of an apparatus of a wireless communication network utilizing a Key Performance Indicator, KPI. In an embodiment, the apparatus may be a network node or (e/g)NodeB, a part of a network node or (e/g)NodeB, or a mobile terminal or a part of a mobile terminal or any other apparatus capable of executing following steps.

In step 500, the apparatus is configured to select a KPI, such as sum spectral efficiency, average channel magnitude or average SINR, for example.

In step 502, the apparatus is configured to select a minimum desired KPI value and set it as a threshold δ. In an embodiment, the threshold may depend on service or application. It may be selected by the operator or owners of the restricted area, for example.

In step 504, the apparatus is configured to set the number M of subcarriers to be blanked equal to S−1, where S is the total number of available subcarriers.

In step 506, the apparatus is configured to calculate the selected KPI value for all the $$K = \binom{S}{M}$$

combinations of blanking M subcarriers out of S.

In step 508, the apparatus is configured to compare the calculated KPI values with the threshold. If the threshold is not reached with any calculated KPI, i.e. if $\exists i$, with i=1, ..., K, such that $KPI_i<\delta$, the apparatus is configured to set M=M−1 in step 510 and go back to step 506.

Otherwise, in step 512, the apparatus is configured to select M as the number of subcarriers to be blanked.

The selection of which subcarriers are to be blanked may be determined in various ways.

Figure 6:
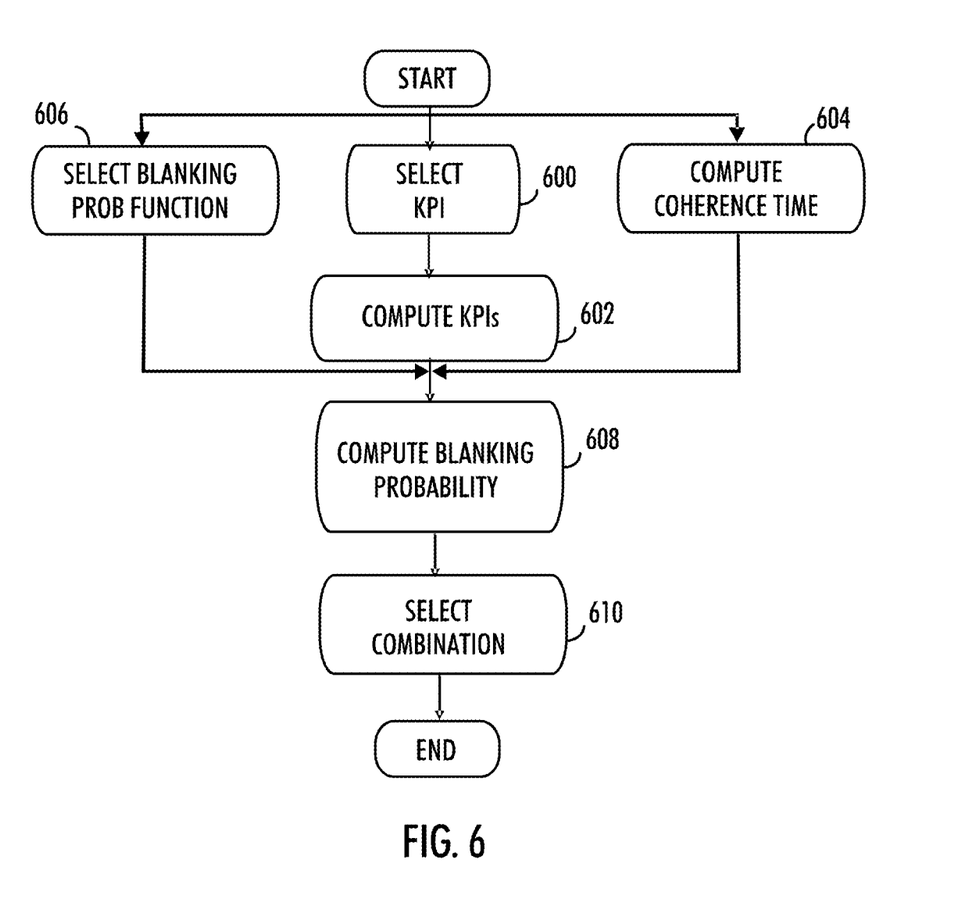

FIG. 6 illustrates a flowchart according to an embodiment. The flowchart illustrates an example of the operation of an apparatus of a wireless communication network utilizing a Key Performance Indicator, KPI. In an embodiment, the apparatus may be a network node or (e/g)NodeB, a part of a network node or (e/g)NodeB, or a mobile terminal or a part of a mobile terminal or any other apparatus capable of executing following steps.

In step 600, the apparatus is configured to select a KPI, such as sum spectral efficiency, average channel magnitude or average SINR, for example.

In step 602, the apparatus is configured to calculate the selected KPI value for all the $$K = \binom{S}{M}$$

combinations of blanking M subcarriers out of S, where S is the total number of available subcarriers.

In step 604, the apparatus is configured to calculate coherence time $T_{COH}$ of the channel on which blanking is to be utilized.

In step 606, the apparatus is configured to select the function for computing the blanking probability, where the function is such that $\Sigma_{i=1}^{K}$ Prob [blank combination i]=1. Below are given some examples of possible functions.

In step 608, the apparatus is configured to determine blanking probability for the different configurations of M blanked subcarriers or subcarrier groups.

In step 610, the apparatus is configured to select the configuration of M blanked subcarriers or subcarrier groups having highest blanking probability.

Figure 7:
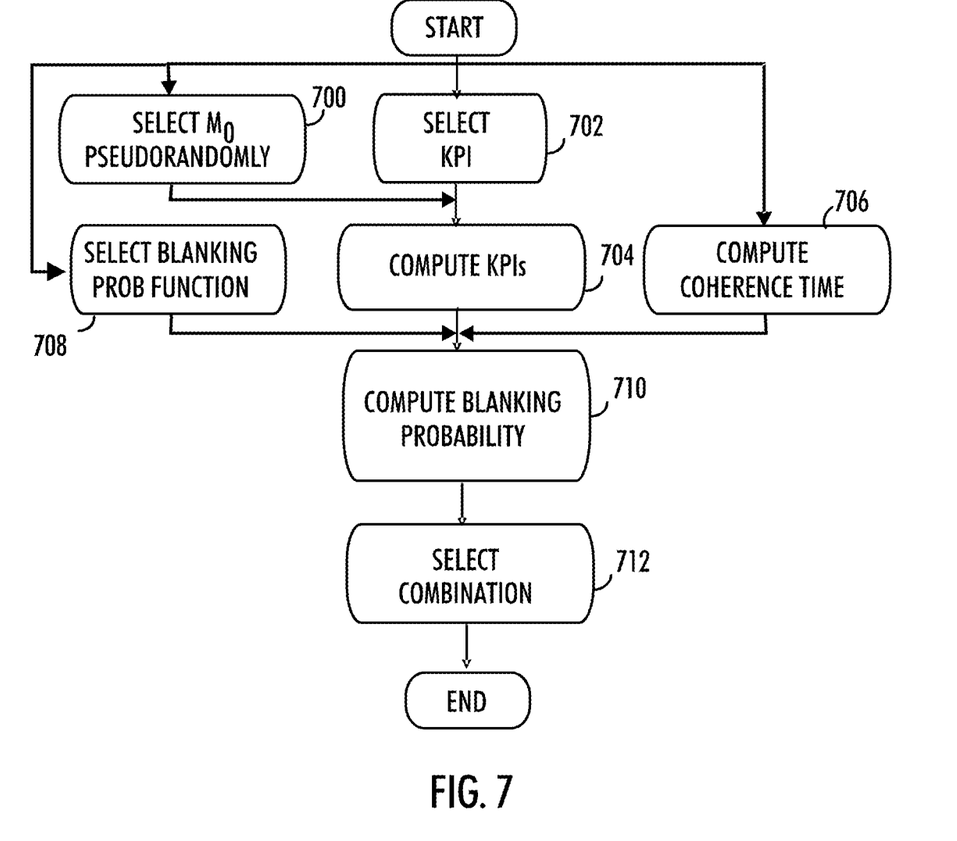

FIG. 7 illustrates a flowchart according to an embodiment. The flowchart illustrates an example of the operation of an apparatus of a wireless communication network utilizing a combination of pseudorandom selection and Key Performance Indicator, KPI. In an embodiment, the apparatus may be a network node or (e/g)NodeB, a part of a network node or (e/g)NodeB, or a mobile terminal or a part of a mobile terminal or any other apparatus capable of executing following steps.

In step 700, the apparatus is configured to select part of the M subcarriers or subcarrier groups utilizing a pseudo-random algorithm. In an embodiment, the apparatus is configured to select a set of subcarriers $M_0=\{m_1, \ldots, m_{M_0}\}$, where $m_1, \ldots, m_{M_0}$ are chosen pseudo-randomly within the set $\mathcal{S}=\{1, \ldots, S\}$, and $M_0<M$.

In step 702, the apparatus is configured to select a KPI, such as sum spectral efficiency, average channel magnitude or average SINR, for example.

In step 704, the apparatus is configured to calculate all the $$K = \binom{S-M_0}{M-M_0}$$

sets of combinations of blanking M−$M_0$ subcarriers out of S−$M_0$, such that for each combination $\mathcal{K}_i=\{k_{i,1}, \ldots, k_{i,M-M_0}\}$, $k_{i,j} \in \{1, \ldots, S\} \setminus \mathcal{M}_0$, i=1, ..., K.

Then the apparatus is configured to calculate the selected KPI value for all the K combinations.

In step 706, the apparatus is configured to calculate coherence time $T_{COH}$ of the channel on which blanking is to be utilized.

In step 708, the apparatus is configured to select the function for computing the blanking probability, where the function is such that $\Sigma_{i=1}^{K}$ Prob[blank combination i]=1. Below are given some examples of possible functions.

In step 710, the apparatus is configured to determine blanking probability for the different configurations of M blanked subcarriers or subcarrier groups.

In step 712, the apparatus is configured to select the configuration of M blanked subcarriers or subcarrier groups having highest blanking probability.

In an embodiment, if the procedures of FIGS. 6 and 7 are executed by a gNB, informing the mobile terminal that an arbitrary set of subcarriers are to be blanked may increase the control overhead. However, these procedures can also be implemented considering Physical Resource Blocks, PRB, or other similar subcarrier grouping instead of individual subcarriers.

In the procedures of FIGS. 6 and 7, the selection of which subcarriers are to be blanked, disclose an exhaustive search among all the possible K combinations. However, that may be of a high complexity depending on the scenario and the system parameters. Therefore, in an embodiment, some heuristics may be applied and, instead of the exhaustive search, a limited number of combinations K'<<K may be evaluated, where the K' combinations can be selected with a given criteria, for example:
  completely randomly;
  randomly but non-overlapping, i.e., different combinations must include different sub-carriers;
  randomly but with partial overlapping, i.e., different combinations can include a maximum number of overlapping subcarriers.

There are various alternatives to select the function for computing the blanking probability in steps 606 and 708. The probability function may be defined as a function that takes as input KPI values and coherence time and outputs a probability value associated to a certain combination of subcarriers, and it is such that the sum of the probabilities of all the combinations is equal to 1.

A KPI based function may be defined as $$P[\text{blank combination } i] = \frac{1}{K-1}\left(1 - \frac{KPI_i}{\sum_{j=1}^{K} KPI_j}\right),$$

where $KPI_i$ is the KPI value computed when blanking combination i.

A KPI and coherence time $T_{COH}$ based function may be defined by first computing the equivalent number of OFDM slots corresponding to the coherence time $T_{COH}$:

$$N_{slot} = \left\lceil \frac{T_{coh}}{T_{slot}} \right\rceil,$$

where $T_{slot}$ is OFDM slot duration. Next, the KPI values may be sorted in an increasing order: $KPI_1 < \ldots < KPI_K$. The blanking probability function is $$P[\text{blank combination } i] = \begin{cases} \frac{1}{N_{slot}} & 1 \le i \le N_{slot} \\ 0 & N_{slot} < i \le K \end{cases}.$$

Another KPI and coherence time $T_{COH}$ based function may be defined by first computing the equivalent number of OFDM slots corresponding to the coherence time $T_{COH}$:

$$N_{slot} = \left\lceil \frac{T_{coh}}{T_{slot}} \right\rceil,$$

where $T_{slot}$ is OFDM slot duration. Next, the KPI values may be sorted in an increasing order: $KPI_1 < \ldots < KPI_K$. The blanking probability function is $$P[\text{blank combination } i] = \begin{cases} \frac{1}{N_{slot}}\left(1 - \frac{KPI_i}{\sum_{j=1}^{N_{slot}} KPI_j}\right) & 1 \le i \le N_{slot} \\ 0 & N_{slot} < i \le K \end{cases}.$$

In the above embodiments, first the number of subcarriers M to be blanked are determined and then it is determined which M subcarriers out of the S available should be blanked. However, also other simpler heuristic algorithms can be used for selecting jointly the number and the index of the subcarriers to be blanked, with lower performance but also lower complexity.

Figure 8:
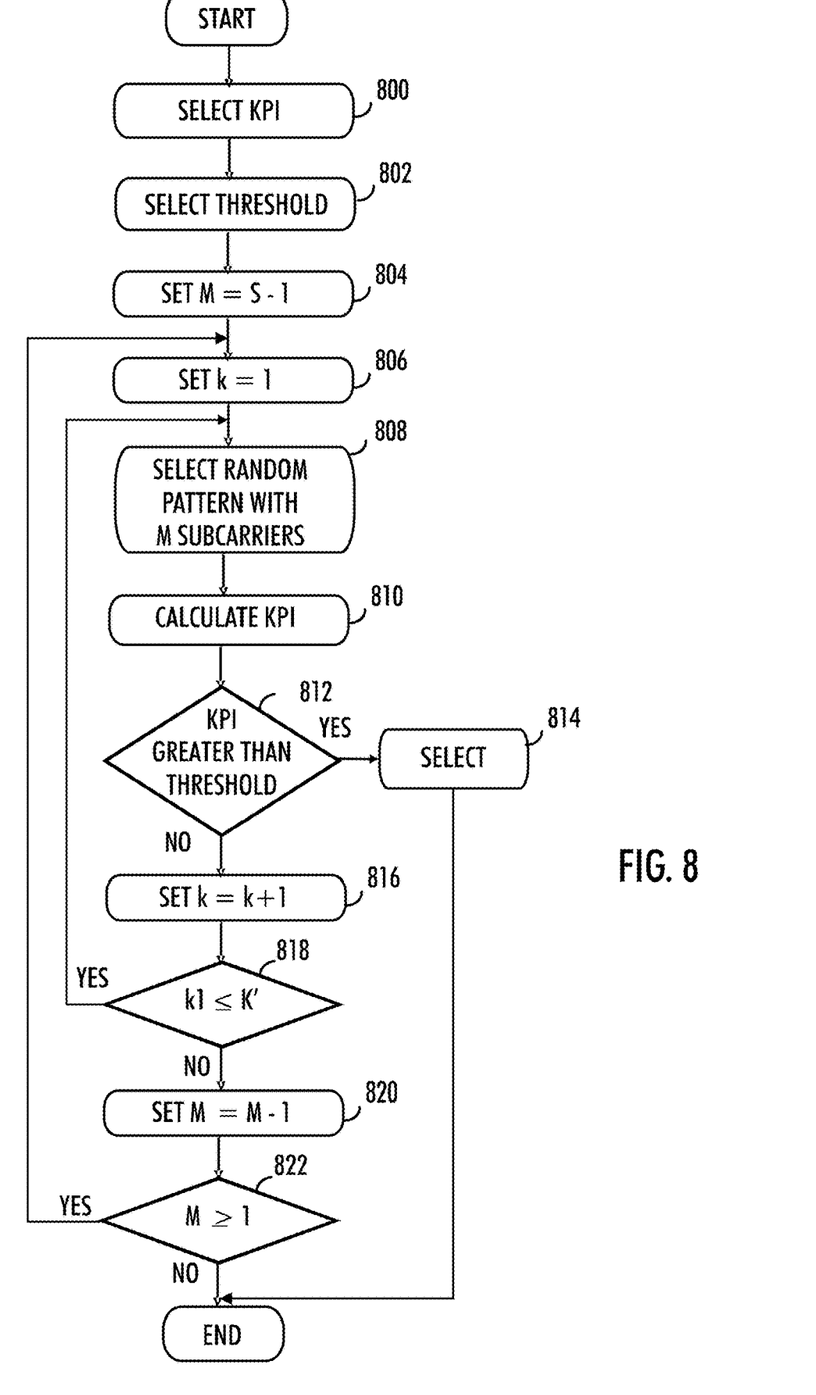

FIG. 8 illustrates another embodiment following greedy heuristic where it is proposed to search among K' random combinations for each decreasing value of M. The flowchart illustrates an example of the operation of an apparatus of a wireless communication network utilizing a combination of pseudorandom selection and Key Performance Indicator, KPI. In an embodiment, the apparatus may be a network node or (e/g)NodeB, a part of a network node or (e/g)NodeB, or a mobile terminal or a part of a mobile terminal or any other apparatus capable of executing following steps.

In step 800, the apparatus is configured to select a KPI, such as sum spectral efficiency, average channel magnitude or average SINR, for example.

In step 802, the apparatus is configured to select a minimum desired KPI value and set it as a threshold δ.

In step 804, the apparatus is configured to set M=S−1.

In step 806, the apparatus is configured to set k=1.

In step 808, the apparatus is configured to choose a random blanking pattern with M blanked subcarriers.

In step 810, the apparatus is configured to compute KPI value for this blanking pattern.

In step 812, the apparatus is configured to determine if the computed KPI exceeds the threshold δ. If so, the M subcarriers corresponding to the selected combination are selected in step 814 for blanking and the procedure ends.

Otherwise, in step 816, the apparatus is configured to set k=k+1.

In step 818, the apparatus is configured to determine if k≤K'. If so, the process continues in step 808.

Otherwise, in step 820, the apparatus is configured to set M=M−1.

In step 822, the apparatus is configured to determine if M≥1. In such a case the process continues in step 806, otherwise the process ends.

Figure 9:
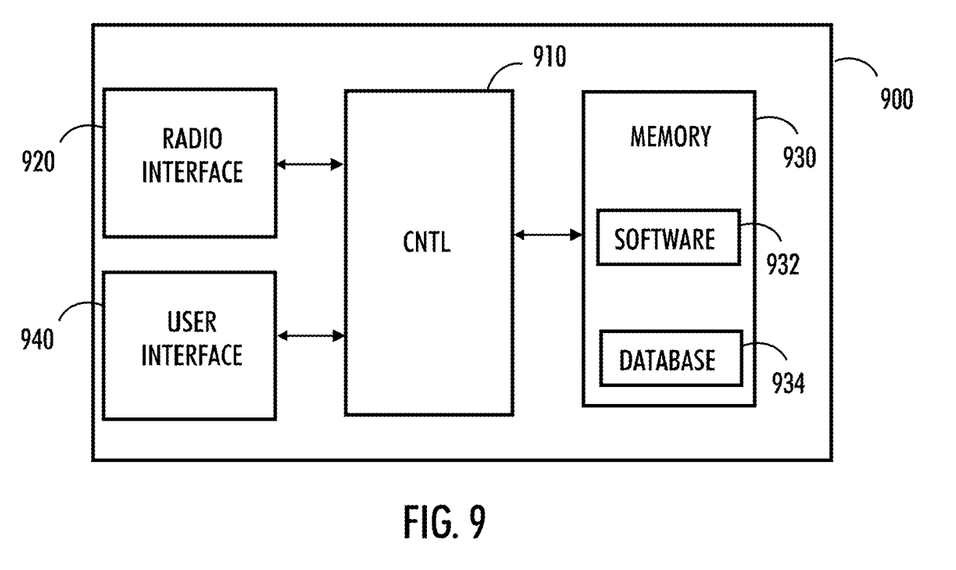
FIG. 9 illustrates an apparatus according to an embodiment.

FIG. 9 illustrates an apparatus according to some embodiments. FIG. 9 provide an apparatus 900 comprising a control circuitry 910, such as at least one processor, and at least one memory 930 including a computer program code (software) 932, wherein the at least one memory and the computer program code (software) 932, are configured, with the at least one processor, to cause the respective apparatus 900 to carry out any one of the embodiments described above.

The memory 930, may be implemented using any suitable data storage technology, such as semiconductor based memory devices, flash memory, magnetic memory devices and systems, optical memory devices and systems, fixed memory and removable memory. The memory 930 may comprise a database 934 for storing data.

The apparatus 900 may further comprise radio interface 920 comprising hardware and/or software for realizing communication connectivity according to one or more communication protocols. The radio interface 920 may provide the apparatus with communication capabilities to access the radio access network, for example. The radio interface 920 may comprise standard well-known components such as an amplifier, filter, frequency-converter, (de)modulator, and encoder/decoder circuitries and one or more antennas. The radio interface 920 may provide access to F1 and/or Xn interfaces for example, and/or provide uplink and/or downlink communication capability.

The apparatus 900 may comprise user interface 940 comprising, for example, at least one keypad, a microphone, a touch display, a display, a speaker, etc. The user interface 940 may be used to control the respective apparatus by a user of the apparatus.

In an embodiment, the apparatus 900 may be or be comprised in a network element, performing the methods described above. For example, the apparatus 900 may be or be comprised in the network node 122, 104, or UE 100 or UE 102.

According to an embodiment, with reference to FIG. 9, the control circuitry 910 may be configured to determine a number M of subcarriers in a time-frequency resource grid to be blanked based on probability of detecting a jammer attack or on channel quality of subcarriers in the time-frequency resource grid, determine which M subcarriers in the time-frequency resource grid are blanked taking into account the channel quality of subcarriers in the time-frequency resource grid and output the M subcarriers in the time-frequency resource grid to be blanked.

In an embodiment, at least some of the functionalities of the apparatus 900 may be shared between two or more physically separate devices, forming one operational entity. Therefore, the apparatus 900 may be seen to depict the operational entity comprising one or more physically separate devices for executing at least some of the described processes. Thus, the apparatus 900 utilizing such shared architecture, may comprise a remote control unit (RCU), such as a host computer or a server computer, operatively coupled (e.g. via a wireless or wired network) to a remote radio head (RRH), such as a Transmission Point (TRP), located in a base station or network node 104, for example. In an embodiment, at least some of the described processes may be performed by the RCU. In an embodiment, the execution of at least some of the described processes may be shared among the RRH and the RCU. For example, CU/DU split may utilize such shared architecture.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

According to an aspect there is provided a system comprising a plurality of apparatuses 900.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 8 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments described above.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments described above.

According to yet another embodiment, the apparatus carrying out the embodiments comprises means for determining M subcarriers in a time-frequency resource grid to be blanked and output the M subcarriers in the time-frequency resource grid to be blanked by performing at least one of the following operations: first determination of a number M of subcarriers in the time-frequency resource grid to be blanked based on probability of detecting a jammer attack or on channel quality of subcarriers in the time-frequency resource grid, second determination of which M subcarriers in the time-frequency resource grid are blanked taking into account the channel quality of subcarriers in the time-frequency resource grid.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described above may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
at least one processor; and
at least one memory including computer program code, wherein the at least one memory and the computer program code are configured, with the at least one processor, to cause the apparatus to:
determine M subcarriers in a time-frequency resource grid to be blanked;
output the M subcarriers in the time-frequency resource grid to be blanked by performing at least one of:
a first determination of a number M of subcarriers in the time-frequency resource grid to be blanked based on probability of detecting a jammer attack or on channel quality of subcarriers in the time-frequency resource grid; and
a second determination of which M subcarriers in the time-frequency resource grid are blanked taking into account the channel quality of subcarriers in the time-frequency resource grid;
determine detection probability to a given type of jamming attack; and
determine the number M of subcarriers with which the detection probability is larger than a given threshold.

2. The apparatus of claim 1, wherein the at least one memory and the computer program code are configured, with the at least one processor, to cause the apparatus further to perform selecting which M subcarriers are blanked pseudo-randomly, if only the first determination is performed.

3. The apparatus of claim 1, wherein the at least one memory and the computer program code are configured, with the at least one processor, to cause the apparatus further to perform selecting the number M of subcarriers to be blanked pseudo-randomly or as a fixed number if only the second determination is performed.

4. The apparatus of claim 1, wherein the at least one memory and the computer program code are configured, with the at least one processor, to cause the apparatus further to:
select a key performance indicator of the wireless communication network; and
determine the number M of subcarriers with which the key performance indicator is larger than a given threshold.

5. The apparatus of claim 1, wherein the at least one memory and the computer program code are configured, with the at least one processor, to cause the apparatus further to:

select a key performance indicator of the wireless communication network;
compute the key performance indicator for different configurations of M blanked subcarriers or subcarrier groups;
compute coherence time of channel on which blanking is utilized;
determine blanking probability for the different configurations of M blanked subcarriers or subcarrier groups; and
select a configuration of M blanked subcarriers or subcarrier groups having highest blanking probability.

6. The apparatus of claim 5, wherein the at least one memory and the computer program code are configured, with the at least one processor, to cause the apparatus further to:
select a part of the M subcarriers or subcarrier groups utilizing a pseudorandom algorithm,
select remaining of the M subcarriers or subcarrier groups utilizing determined blanking probabilities.

7. The apparatus of claim 1, wherein the at least one memory and the computer program code are configured, with the at least one processor, to cause the apparatus further to determine jointly the number and an index of the subcarriers to be blanked.

8. The apparatus of claim 1, wherein the at least one memory and the computer program code are configured, with the at least one processor, to cause the apparatus further to:
initiate reception of a transmission from another apparatus of the wireless communication network on said time-frequency resource grid;
cause performing an interference measurement on said-one or more blanked subcarrier to obtain interference measurement data on said one or more blanked subcarriers; and
output the interference measurement data for detecting a presence of radio jamming.

9. A method for an apparatus of a wireless communication network, comprising:
determining M subcarriers in a time-frequency resource grid to be blanked; and
outputting the M subcarriers in the time-frequency resource grid to be blanked by performing at least one of:
a first determination of a number M of subcarriers in a time-frequency resource grid to be blanked based on probability of detecting a jammer attack or on channel quality of subcarriers in the time-frequency resource grid, and
a second determination of which M subcarriers in the time-frequency resource grid are blanked taking into account the channel quality of subcarriers in the time-frequency resource grid;
determining detection probability to a given type of jamming attack; and
determining the number M of subcarriers with which the detection probability is larger than a given threshold.

10. The method of claim 9, further comprising:
selecting which M subcarriers are blanked pseudo-randomly, if only the first determination is performed.

11. The method of claim 9, further comprising:
selecting the number M of subcarriers to be blanked pseudo-randomly or as a fixed number if only the second determination is performed.

12. The method of claim 9, further comprising:
selecting a key performance indicator of the wireless communication network; and
determining the number M of subcarriers with which the key performance indicator is larger than a given threshold.

13. The method of claim 9, further comprising:
selecting a key performance indicator of the wireless communication network;
computing the key performance indicator for different configurations of M blanked subcarriers or subcarrier groups;
computing coherence time of channel on which blanking is utilized, determining blanking probability for the different configurations of M blanked subcarriers or subcarrier groups; and
selecting the configuration of M blanked subcarriers or subcarrier groups having highest blanking probability.

14. A non-transitory computer-readable medium encoded with instructions that, when executed in hardware, perform a process, the process comprising:
determining M subcarriers in a time-frequency resource grid to be blanked; and
outputting the M subcarriers in the time-frequency resource grid to be blanked by performing at least one of:
  determining a number M of subcarriers in a time-frequency resource grid to be blanked based on probability of detecting a jammer attack or on channel quality of subcarriers in the time-frequency resource grid;
  determining which M subcarriers in the time-frequency resource grid are blanked taking into account the channel quality of subcarriers in the time-frequency resource grid;
outputting the M subcarriers in the time-frequency resource grid to be blanked;
determining detection probability to a given type of jamming attack; and
determining the number M of subcarriers with which the detection probability is larger than a given threshold.

* * * * *